(12) United States Patent
Dücker et al.

(10) Patent No.: US 7,994,266 B2
(45) Date of Patent: Aug. 9, 2011

(54) DROPPING METHOD FOR LIQUIDS

(75) Inventors: Carolin Nadine Dücker, Ludwigshafen (DE); Dennis Loesch, Altrip (DE); Volker Seidl, Mannheim (DE)

(73) Assignee: BASF SE, Ludwigshafen (DE)

( * ) Notice: Subject to any disclaimer, the term of this patent is extended or adjusted under 35 U.S.C. 154(b) by 527 days.

(21) Appl. No.: 12/065,328

(22) PCT Filed: Sep. 5, 2006

(86) PCT No.: PCT/EP2006/066016
§ 371 (c)(1),
(2), (4) Date: Feb. 29, 2008

(87) PCT Pub. No.: WO2007/031441
PCT Pub. Date: Mar. 22, 2007

(65) Prior Publication Data
US 2008/0242817 A1 Oct. 2, 2008

(30) Foreign Application Priority Data
Sep. 14, 2005 (DE) .......................... 10 2005 044 035

(51) Int. Cl.
*C08F 20/06* (2006.01)
*B01J 19/26* (2006.01)

(52) U.S. Cl. ..................... 526/317.1; 422/129

(58) Field of Classification Search ................. 526/317, 526/317.1; 250/434, 435, 436; 422/129
See application file for complete search history.

(56) References Cited

U.S. PATENT DOCUMENTS

| 3,952,078 A | 4/1976 | Bradley et al. |
| 5,059,664 A * | 10/1991 | Yada et al. ................ 526/240 |
| 5,256,362 A | 10/1993 | Goto et al. |
| 5,269,980 A | 12/1993 | Levendis et al. |
| 6,284,362 B1 * | 9/2001 | Takai et al. .................. 428/326 |
| 6,291,605 B1 * | 9/2001 | Freeman et al. ............. 526/88 |
| 6,399,730 B1 * | 6/2002 | Freeman et al. ............. 526/310 |
| 7,727,586 B2 * | 6/2010 | Bruhns et al. ................. 427/213 |
| 2006/0217508 A1 | 9/2006 | Schmid et al. |
| 2007/0100115 A1 | 5/2007 | Schmid et al. |

FOREIGN PATENT DOCUMENTS

| BE | 700 776 | 1/1968 |
| DE | 103 14 466 | 10/2004 |
| DE | 103 40 253 | 3/2005 |
| EP | 0 348 180 | 12/1989 |
| WO | WO-96/40427 | 12/1996 |

OTHER PUBLICATIONS

International Search Report in PCT/EP2006/066016 dated Mar. 6, 2007.
Buchholz et al., Modern Superabsorbent Polymer Technology, pp. 73-103 (1998).
Ullmann et al., *Ullmann's Encyclopedia of Industrial Chemistry*, 6th ed., vol. 35, pp. 1-21, New York: Wiley, 2005.

* cited by examiner

*Primary Examiner* — David Wu
*Assistant Examiner* — Vu A Nguyen
(74) *Attorney, Agent, or Firm* — Marshall, Gerstein & Borun LLP

(57) ABSTRACT

In a process for dropletizing a liquid by means of a dropletizer plate at least the underside of the dropletizer plate has at least in part a contact angle of at least 60° with regard to the liquid to be dropletized.

13 Claims, No Drawings

DROPPING METHOD FOR LIQUIDS

CROSS-REFERENCE TO RELATED APPLICATIONS

This is the U.S. national phase application of International Application No. PCT/EP2006/066016, filed Sep. 5, 2006, which claims the benefit of German patent application No. 10 2005 044 035.5, filed Sep. 14, 2005.

DESCRIPTION

The present invention relates to a process for dropletizing a liquid by means of a dropletizer plate wherein at least the underside of the dropletizer plate has at least in part a contact angle of at least 60° with regard to the liquid to be dropletized, and to the use of the process for producing water-absorbing polymeric particles.

Water-absorbing polymers are in particular polymers of (co)polymerized hydrophilic monomers, graft (co)polymers of one or more hydrophilic monomers on a suitable grafting base, crosslinked ethers of cellulose or of starch, crosslinked carboxymethylcellulose, partially crosslinked polyalkylene oxide or natural products swellable in aqueous fluids, such as guar derivatives for example. Such polymers are used as products capable of absorbing aqueous solutions to produce diapers, tampons, sanitary napkins and other hygiene articles, but also as water-retaining agents in market gardening.

The production of water-absorbing polymers is described for example in the monograph "Modern Superabsorbent Polymer Technology", F. L. Buchholz and A. T. Graham, Wiley-VCH, 1998, or in Ullmann's Encyclopedia of Industrial Chemistry, 6th edition, volume 35, pages 73 to 103.

The properties of the water-absorbing polymers can be controlled via the degree of crosslinking. Gel strength increases and absorptive capacity decreases with increasing degree of crosslinking. Consequently, as Absorbency Under Load (AUL) increases, Centrifuge Retention Capacity (CRC) decreases (although at very high degrees of crosslinking Absorbency Under Load decreases, too).

To improve their performance characteristics, for example Saline Flow Conductivity (SFC) in the diaper and Absorbency Under Load (AUL), water-absorbing polymeric particles are generally postcrosslinked. This increases only the degree of crosslinking of the particle surface, making it possible to decouple Absorbency Under Load (AUL) and Centrifuge Retention Capacity (CRC) to some extent at least. This postcrosslinking can be carried out in the aqueous gel phase. Preferably, however, ground and screened particles of the base polymer are surface coated with a postcrosslinker, thermally postcrosslinked and dried. Useful crosslinkers for this include compounds comprising at least two groups capable of forming covalent bonds with the carboxylate groups of the hydrophilic polymer.

Postcrosslinking is described in the monograph "Modern Superabsorbent Polymer Technology", F. L. Buchholz and A. T. Graham, Wiley-VCH, 1998, pages 97 to 103. Typically, the water-absorbing polymeric particles are wetted with the postcrosslinker and thermally postcrosslinked by the polymeric particles being heated, and concurrently dried, by means of hot air or by means of contact drying. To distribute the postcrosslinker evenly on the particle surface, the postcrosslinker is typically used in the form of a solution in a solvent, preferably water or an aqueous solution. The solvent is typically removed again after the postcrosslinking operation.

Spray polymerization is a way to combine the polymerization and drying steps. In addition, particle size becomes controllable within certain limits through suitable process management.

The production of water-absorbing polymeric particles by spray polymerization is described for example in EP-A-0 348 180, WO-A-96/40427, DE-A-103 14 466 and also DE-A-103 40 253.

The reaction can also be carried out in apparatuses in which the monomer solution is able to free-fall in the form of monodisperse droplets. Useful apparatus includes for example those described in U.S. Pat. No. 5,269,980 column 3 lines 25 to 32. The polymerization of monodisperse droplets leads to polymeric particles of narrow particle size distribution.

It is an object of the present invention to provide an improved process for producing water-absorbing polymeric particles of narrow particle size distribution, in particular having a low fraction of small particles.

We have found that this object is achieved by a process for dropletizing a liquid by means of a dropletizer plate wherein at least the underside of the dropletizer plate has at least in part a contact angle of at least 60° with regard to the liquid.

A dropletizer plate is a plate having at least one drilled hole, the liquid passing downwardly through the drilled hole. The dropletizer plate or liquid is oscillated, the vibration generating a monodisperse chain of droplets on the underside of the dropletizer plate. The functioning of a dropletizer plate is also explained in U.S. Pat. No. 5,269,980 at column 3 lines 37 to 54.

The number of drilled holes is chosen according to the desired capacity and droplet size. The dropletizer plate typically has at least one, preferably at least 10, more preferably at least 50 and typically up to 10 000, preferably up to 5000 and more preferably up to 1000 drilled holes, the drilled holes typically forming a uniform distribution over the dropletizer plate, preferably in a so-called triangular pitch, i.e., three drilled holes at a time form the corners of an equilateral triangle.

The diameter of the drilled holes is adapted to the desired droplet size. The diameter of the drilled holes is typically at least 50 µm, preferably at least 75 µm and more preferably at least 100 µm and typically up to 1000 µm, preferably up to 600 µm and more preferably up to 300 µm.

It may be preferable to place the dropletizer plate on a carrier plate which likewise has drilled holes. The drilled holes in the carrier plate have a larger diameter than the drilled holes in the dropletizer plate and are arranged such that each drilled hole in the dropletizer plate is above a concentric drilled hole in the carrier plate. This arrangement allows a fast change of the dropletizer plate, for example in order that droplets of another size may be generated. Such a system of dropletizer plate and carrier plate shall be deemed to be a dropletizer plate for the purposes of this invention, i.e., the underside of the dropletizer plate/carrier plate system is the underside of the dropletizer plate.

The contact angle is a measure of the wetting behavior of a liquid, in particular water, with regard to a surface, and can be determined using conventional methods, for example in accordance with ASTM D 5725. A low contact angle denotes good wetting, and a high contact angle denotes poor wetting.

Preferably, the contact angle of the entire underside of the dropletizer plate is at least 60° with regard to the liquid to be dropletized. But the dropletizer plate may also wholly consist of a material which has a contact angle of at least 600 with regard to the liquid to be dropletized.

The contact angle with regard to the liquid to be dropletized is preferably at least 70°, more preferably at least 800 and most preferably at least 900.

It is preferable to dropletize aqueous solutions, i.e., the dropletizer plate has in this case a contact angle of at least 60°, preferably at least 70°, more preferably at least 80° and most preferably at least 90° with regard to water.

But it is also possible for the dropletizer plate to consist of a material having a lower contact angle with regard to the liquid to be dropletized, for example a steel having the German construction material code number of 1.4571, and be coated with a material having a larger contact angle with regard to the liquid to be dropletized.

Useful coatings include for example fluorous polymers, such as perfluoroalkoxyethylene, polytetrafluoroethylene, ethylene-chlorotrifluoroethylene copolymers, ethylene-tetrafluoroethylene copolymers and fluorinated polyethylene.

The coatings can be applied to the substrate as a dispersion, in which case the solvent is subsequently evaporated off and the coating is heat treated. For polytetrafluoroethylene this is described for example in U.S. Pat. No. 3,243,321.

Further coating processes are to found under the headword "Thin Films" in the electronic version of "Ullmann's Encyclopedia of Industrial Chemistry" (Updated Sixth Edition, 2000 Electronic Release).

The coatings can further be incorporated in a nickel layer in the course of a chemical nickelization.

It is the poor wettability of the dropletizer plate that leads to the production of monodisperse droplets of narrow droplet size distribution.

The dropletization process of the present invention is useful for any application where a narrow droplet size distribution is desired. Examples thereof are the end-iteming of melts, spray drying and spray polymerization.

A stearic acid melt may be dropletized for example to obtain droplets having a narrow particle size distribution after solidification.

It is similarly possible to dry solutions, in which case dried particles having a narrow particle size distribution are likewise obtained.

But it is particularly preferable to use the dropletization of the present invention for spray polymerization, in particular to produce water-absorbing polymeric particles.

The water-absorbing polymeric particles producible by the process of the present invention can be produced by polymerization of a monomer solution comprising
a) at least one ethylenically unsaturated acid-functional monomer,
b) at least one crosslinker,
c) if appropriate one or more ethylenically and/or allylically unsaturated monomers copolymerizable with the monomer a), and
d) if appropriate one or more water-soluble polymers onto which the monomers a), b) and if appropriate c) can be at least partly grafted.

Suitable monomers a) are for example ethylenically unsaturated carboxylic acids, such as acrylic acid, methacrylic acid, maleic acid, fumaric acid and itaconic acid, or derivatives thereof, such as acrylamide, methacrylamide, acrylic esters and methacrylic esters. Acrylic acid and methacrylic acid are particularly preferred monomers. Acrylic acid is most preferable.

The acid groups of monomers a) are typically in a partially neutralized state, the extent of neutralization being preferably in the range from 25 to 85 mol %, more preferably in the range from 27 to 80 mol %, and even more preferably in the range from 27 to 30 mol % or from 40 to 75 mol %, for which the customary neutralizing agents can be used, preferably alkali metal hydroxides, alkali metal oxides, alkali metal carbonates or alkali metal bicarbonates and also mixtures thereof. Ammonium salts can also be used instead of alkali metal salts. Sodium and potassium are particularly preferred as alkali metals, but most preference is given to sodium hydroxide, sodium carbonate or sodium bicarbonate and also mixtures thereof. Typically, neutralization is achieved by mixing the neutralizing agent as an aqueous solution, as a melt or else preferably as a solid material into the monomer solution. For example, sodium hydroxide having a water fraction of distinctly below 50% by weight can be present as a waxy mass having a melting point above 23° C. In this case, metering as piece goods or melt at elevated temperature is possible.

The monomers a) and especially acrylic acid comprise preferably up to 0.025% by weight of a hydroquinone half ether. Preferred hydroquinone half ethers are hydroquinone monomethyl ether (MEHQ) and/or tocopherols.

Tocopherol refers to compounds of the following formula

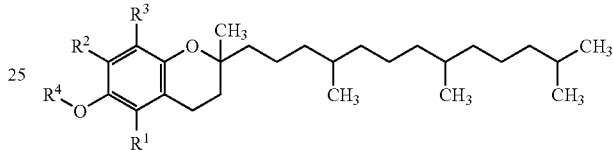

where $R^1$ is hydrogen or methyl, $R^2$ is hydrogen or methyl, $R^3$ is hydrogen or methyl and $R^4$ is hydrogen or an acyl radical of 1 to 20 carbon atoms.

Preferred $R^4$ radicals are acetyl, ascorbyl, succinyl, nicotinyl and other physiologically tolerable carboxylic acids. The carboxylic acids can be mono-, di- or tricarboxylic acids.

Preference is given to alpha-tocopherol where $R^1=R^2=R^3=$methyl, especially racemic alpha-tocopherol. $R^1$ is more preferably hydrogen or acetyl. RRR-alpha-tocopherol is preferred in particular.

The monomer solution comprises preferably not more than 130 weight ppm, more preferably not more than 70 weight ppm, preferably not less than 10 weight ppm, more preferably not less than 30 weight ppm and especially around 50 weight ppm of hydroquinone half ether, all based on acrylic acid, with acrylic acid salts being arithmetically counted as acrylic acid. For example, the monomer solution can be produced using an acrylic acid having an appropriate hydroquinone half ether content. The crosslinkers b) are compounds having at least two free-radically polymerizable groups which can be free-radically interpolymerized into the polymer network. Useful crosslinkers b) are for example ethylene glycol dimethacrylate, diethylene glycol diacrylate, allyl methacrylate, trimethylolpropane triacrylate, triallylamine, tetraalloxyethane, as described in EP-A-0 530 438, di- and triacrylates as described in EP-A-0 547 847, EP-A-0 559 476, EP-A-0 632 068, WO-A-93/21237, WO-A-03/104299, WO-A-03/104300, WO-A-03/104301 and DE-A-103 31 450, mixed acrylates which, as well as acrylate groups, comprise further ethylenically unsaturated groups, as described in DE-A-103 31 456 and prior German application 10355401.7, or crosslinker mixtures as described for example in DE-A-195 43 368, DE-A-196 46 484, WO-A-90/15830 and WO-A-02/32962.

Useful crosslinkers b) include in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate, ethylene glycol dimethacrylate and also trimethylolpropane triacrylate and allyl compounds, such as allyl (meth)acrylate, triallyl cyanurate, diallyl maleate, polyallyl esters, tetraallyloxyethane, triallylamine, tetraallylethylenediamine, allyl esters of phosphoric acid and also vinylphosphonic acid derivatives as described for example in EP-A-0 343 427. Useful crosslinkers b) further include pentaerythritol diallyl ether, pentaerythritol triallyl ether, pentaerythritol tetraallyl ether, polyethylene glycol diallyl ether, ethylene glycol diallyl ether, glycerol diallyl ether, glycerol triallyl ether, polyallyl ethers based on sorbitol, and also ethoxylated variants thereof. The process of the present invention may utilize di(meth)acrylates of polyethylene glycols, the polyethylene glycol used having a molecular weight between 300 and 1000.

However, particularly advantageous crosslinkers b) are di- and triacrylates of 3- to 15-tuply ethoxylated glycerol, of 3- to 15-tuply ethoxylated trimethylolpropane, of 3- to 15-tuply ethoxylated trimethylolethane, especially di- and triacrylates of 2- to 6-tuply ethoxylated glycerol or of 2- to 6-tuply ethoxylated trimethylolpropane, of 3-tuply propoxylated glycerol, of 3-tuply propoxylated trimethylolpropane, and also of 3-tuply mixed ethoxylated or propoxylated glycerol, of 3-tuply mixed ethoxylated or propoxylated trimethylolpropane, of 15-tuply ethoxylated glycerol, of 15-tuply ethoxylated trimethylolpropane, of 40-tuply ethoxylated glycerol, of 40-tuply ethoxylated trimethylolethane and also of 40-tuply ethoxylated trimethylolpropane.

Very particularly preferred for use as crosslinkers b) are diacrylated, dimethacrylated, triacrylated or trimethacrylated multiply ethoxylated and/or propoxylated glycerols as described for example in WO-A-03/104301 Di- and/or triacrylates of 3- to 10-tuply ethoxylated glycerol are particularly advantageous. Very particular preference is given to di- or triacrylates of 1- to 5-tuply ethoxylated and/or propoxylated glycerol. The triacrylates of 3- to 5-tuply ethoxylated and/or propoxylated glycerol are most preferred. These are notable for particularly low residual levels (typically below 10 weight ppm) in the water-absorbing polymer and the aqueous extracts of water-absorbing polymers produced therewith have an almost unchanged surface tension compared with water at the same temperature (typically not less than 0.068 N/m).

The amount of crosslinker b) is preferably at least 0.001 mol %, more preferably at least 0.01 mol % and most preferably at least 0.1 mol % and preferably up to 10 mol %, more preferably up to 5 mol % and most preferably up to 2 mol %, all based on the monomer a).

Examples of ethylenically unsaturated monomers c) which are copolymerizable with the monomers a) are acrylamide, methacrylamide, crotonamide, dimethylaminoethyl methacrylate, dimethylaminoethyl acrylate, dimethylaminopropyl acrylate, diethylaminopropyl acrylate, dimethylaminobutyl acrylate, dimethylaminoethyl methacrylate, diethylaminoethyl methacrylate, diethylaminoneopentyl acrylate and dimethylaminoneopentyl methacrylate.

Useful water-soluble polymers d) include polyvinyl alcohol, polyvinylpyrrolidone, starch, starch derivatives, polyglycols or polyacrylic acids, preferably polyvinyl alcohol and starch.

The concentration of monomers a) in the monomer solution is typically in the range from 2% to 80% by weight, preferably in the range from 5% to 70% by weight and more preferably in the range from 10% to 60% by weight.

The solubility of monomers a) in water is typically at least 1 g/100 g of water, preferably at least 5 g/100 g of water, more preferably at least 25 g/100 g of water and most preferably at least 50 g/100 g of water, at 23° C.

Preferred polymerization inhibitors require dissolved oxygen for optimum performance. Therefore, the polymerization inhibitors may be freed of dissolved oxygen prior to polymerization by inertization, i.e., flowing an inert gas, preferably nitrogen, through them. The oxygen content of the monomer solution prior to polymerization is preferably lowered to less than 1 weight ppm and more preferably to less than 0.5 weight ppm.

The monomer solution is polymerized in the presence of initiators.

The initiators are used in customary amounts, for example in amounts from 0.001% to 5% by weight and preferably from 0.01% to 1% by weight, based on the monomers to be polymerized.

Useful initiators include all compounds which disintegrate into free radicals under the polymerization conditions, examples being peroxides, hydroperoxides, hydrogen peroxide, persulfates, azo compounds and redox initiators. Preference is given to the use of water-soluble initiators. In some cases it is advantageous to use mixtures of various initiators, examples being mixtures of hydrogen peroxide and sodium or potassium peroxodisulfate. Mixtures of hydrogen peroxide and sodium peroxodisulfate can be used in any proportion.

In line with product requirements, the pH of the polymeric particles producible by the process of the present invention can be adjusted to the desired range via the pH of the monomer solution. For example, polymers for cosmetic applications should typically have a pH in the range from 5 to 6.

The reaction will preferably be carried out in the presence of an inert carrier gas, inert meaning that the carrier gas does not react with the constituents of the monomer solution under the reaction conditions. The inert carrier gas is preferably nitrogen. The oxygen content of the inert carrier gas is advantageously below 5% by volume, preferably below 2% by volume and more preferably below 1% by volume.

The inert carrier gas can be passed through the reaction space concurrently with or countercurrently to the free-falling droplets of the monomer solution, preferably concurrently. Preferably, some or all of the carrier gas, preferably at least 50% of the carrier gas and more preferably at least 75% of the carrier gas, is returned into the reaction space as recycle gas after one pass. Typically, some of the carrier gas and preferably up to 10% of the carrier gas, more preferably up to 3% of the carrier gas and most preferably up to 1% of the carrier gas is removed from the system after each pass.

The gas velocity is preferably such that the flow in the reactor is laminar in that for example there are no convection eddies opposite to the general direction of flow, and is for example in the range from 0.02 to 1.5 m/s and preferably in the range from 0.05 to 0.4 m/s.

The reaction space temperature is preferably in the range from 70 to 250° C., more preferably in the range from 80 to 190° C. and most preferably in the range from 90 to 140° C.

The reaction can be carried out in overpressure or in underpressure, an underpressure of up to 100 mbar compared with ambient pressure being preferred.

The polymerization rate and the drying rate typically have different temperature dependencies. This can mean, for example, that the spray-dispensed droplets dry before the desired conversion has been achieved. It is therefore advantageous to influence the reaction rate and the drying rate separately.

The drying rate can be influenced via the relative humidity of the inert gas. The relative humidity of the inert gas is generally less than 90%, preferably less than 60% and more preferably less than 30%. Relative humidity here refers to the quotient of water vapor partial pressure and maximum water vapor partial pressure (saturation) at a given temperature multiplied by 100%.

The polymerization rate can be controlled through the identity and amount of the initiator system used.

The use of azo compounds or redox initiators as initiators is advantageous for directing the rate of polymerization. The starting characteristics of the polymerization are better directable with azo compounds or redox initiators via the choice of initiator, initiator concentration and reaction temperature than for example with pure peroxide initiators.

The carrier gas is advantageously preheated to the reaction temperature of 70 to 250° C., preferably 80 to 190° C. and more preferably 90 to 140° C. upstream of the reactor.

Photoinitiators are particularly advantageous. When photoinitiators are used, the drying rate can be controlled to the desired value via the temperature without thereby significantly influencing the free-radical formation process at the same time. The photopolymerization is advantageously started by UV lamps in the upper region of the reactor in the vicinity of the dropletizer plate.

The reaction offgas, i.e., the carrier gas leaving the reaction space, can be cooled down in a heat exchanger for example. Suitable heat exchangers are direct heat exchangers, such as scrubbers, and indirect heat exchangers, such as condensers. Water and unconverted monomer condense in the process. Thereafter, the reaction offgas can be at least partially reheated and returned into the reactor as recycle gas. Preferably, the recycle gas is cooled down such that the cooled recycle gas has the water vapor fraction desired for the reaction. A portion of the reaction offgas can be removed from the system and replaced by fresh carrier gas, in which case unconverted monomers comprised in the reaction offgas can be separated off and recycled.

Particular preference is given to an integrated energy system whereby a portion of the heat rejected in the cooling of the offgas is used to heat up the cycle gas.

The reactors can be trace heated. Any trace heating is preferably adjusted such that the wall temperature is not less than 5° C. above reactor internal temperature and condensation at reactor walls is reliably avoided.

The polymeric particles obtained may subsequently be dried and/or postcrosslinked.

Useful postcrosslinkers include compounds comprising at least two groups capable of forming covalent bonds with the carboxylate groups of the hydrogel. Useful compounds include for example alkoxysilyl compounds, polyaziridines, polyamines, polyamidoamines, di- or polyglycidyl compounds, as described in EP-A-0 083 022, EP-A-0 543 303 and EP-A-0 937 736, di- or polyfunctional alcohols, as described in DE-C-33 14 019, DE-C-35 23 617 and EP-A-0 450 922, or p-hydroxyalkylamides, as described in DE-A-102 04 938 and U.S. Pat. No. 6,239,230.

Useful postcrosslinkers are further said to include by DE-A-40 20 780 cyclic carbonates, by DE-A-198 07 502 2-oxazolidone and its derivatives, such as 2-hydroxyethyl-2-oxazolidone, by DE-A-198 07 992 bis- and poly-2-oxazolidinones, by DE-A-198 54 573 2-oxotetrahydro-1,3-oxazine and its derivatives, by DE-A-198 54 574 N-acyl-2-oxazolidones, by DE-A-102 04 937 cyclic ureas, by DE-A-103 34 584 bicyclic amide acetals, by EP-A-1 199 327 oxetanes and cyclic ureas and by WO-A-03/031482 morpholine-2, dione and its derivatives.

The present invention further provides water-absorbing polymeric particles obtainable by the process of the present invention.

The water-absorbing polymeric particles producible by the process of the present invention typically have a Centrifuge Retention Capacity (CRC) of at least 15 g/g, preferably at least 20 g/g and more preferably at least 25 µg. Centrifuge Retention Capacity (CRC) is determined by EDANA (European Disposables and Nonwovens Association) recommended test method No. 441.2-02 "Centrifuge retention capacity".

The water-absorbing polymeric particles producible by the process of the present invention typically have an Absorbency Under Load 0.3 psi (2.07 kPa) of at least 10 g/g, preferably at least 15 g/g and more preferably at least 20 g/g. Absorbency Under Load (AUL) is determined by EDANA (European Disposables and Nonwovens Association) recommended test method No. 442.2-02 "Absorption under pressure".

The present invention further provides processes for producing hygiene articles, in particular diapers, comprising the use of water-absorbing polymeric particles produced by the process of the invention.

The present invention further provides hygiene articles comprising an absorbent layer comprising from 50% to 100% by weight, preferably from 60% to 100% by weight, more preferably from 70% to 100% by weight, even more preferably from 80% to 100% by weight and most preferably from 90% to 100% by weight of water-absorbing polymeric particles according to the present invention, the envelope surrounding the absorbent layer not being included.

The present invention further provides reactors comprising dropletizer plates wherein at least the underside of the dropletizer plates has at least in part a contact angle of at least 600 with regard to water.

The distance between the drilled holes is preferably in the range from 1 to 100 mm, more preferably in the range from 2 to 50 mm and most preferably in the range from 5 to 20 mm.

Dropletizer plate thickness is so chosen that the dropletizer plate is mechanically sufficiently stable but at the same time still able to oscillate or vibrate sufficiently.

Dropletizer plate thickness is preferably in the range from 0.1 to 2 mm, more preferably in the range from 0.2 to 1.5 mm and most preferably in the range from 0.5 to 1 mm, a possible carrier plate not being included.

The contact angle of the entire underside of the dropletizer plate is preferably at least 600 with regard to water. But the dropletizer plate may also wholly consist of a material having a contact angle of at least 60° with regard to water.

The contact angle with regard to water is preferably at least 700, more preferably at least 80° and most preferably at least 90°.

But it is also possible for the dropletizer plate to consist of a material having a lower contact angle with regard to water, for example a steel having the German construction material code number of 1.4571, and be coated with a material having a larger contact angle with regard to water.

Useful coatings include for example fluorous polymers, such as perfluoroalkoxyethylene, polytetrafluoroethylene, ethylene-chlorotrifluoroethylene copolymers, ethylene-tetrafluoroethylene copolymers and fluorinated polyethylene.

The present invention further provides a reactor for producing polymeric particles, said reactor comprising
i) a heatable reaction space,
ii) at least one dropletizer plate according to the present invention for droplet generation in the upper region of the reaction space i),
iii) at least one carrier gas feed,
iv) at least one carrier gas preheater,
v) at least one carrier gas exit, and
vi) selectively at least one means for recycling at least a portion of the exited carrier gas from the carrier gas exit v) to the carrier gas feed iii).

The means vi) comprises for example a compressor, particularly ventilator, a flow rate meter and a closed-loop controllable valve. The compressor increases the pressure of the carrier gas and thus makes it possible for it to be recycled to the carrier gas feed iii). The flow rate meter and the valve can be used to adjust the amount of carrier gas recycled.

The process of the present invention makes it possible to produce water-absorbing polymeric particles of particularly narrow particle size distribution.

EXAMPLES

Example 1 (Comparative)

12 kg of sodium acrylate (37.5% by weight solution in water) and 1.1 kg of acrylic acid were mixed with 3 kg of water and 9 g of 15-tuply ethoxylated trimethylolpropane triacrylate. The solution was admixed with initiators and then dropletized into a heated nitrogen-filled spray tower (170° C., 12 m high, 2 m wide, gas velocity 0.1 m/s in concurrent). The metering rate was 16 kg/h. The dropletizer plate had 37 drilled holes each 170 µm in size. The diameter of the dropletizer plate was 65 mm. The initiators used were 2,2-azobis[2-(2-imidazolin-2-yl)propane]dihydrochloride and 2,2-azobis-(2-amidinopropane) dihydrochloride. The concentration of each initiator was 0.2% by weight, based on the monomer. The admixing of the initiators to the monomer solution took place via a static mixer just upstream of the dropletizer with the initiators in a 2% aqueous solution.

To facilitate deinstalling and cleaning of the dropletizer plate, the dropletizer plate rested on a carrier plate (die plate). The carrier plate, like the dropletizer plate, had 37 drilled holes, but the drilled holes in the carrier plate were larger. The drilled holes in the carrier plate were arranged such that the drilled holes in the carrier plate coincided with the drilled holes in the dropletizer plate.

The carrier plate was made of stainless steel. The contact angle with water was less than 10°.

The particle size distribution of the polymeric particles obtained was determined by laser diffraction.

The fraction of polymeric particles having a diameter of less than 100 µm was 2.3% by weight.

The fraction of polymeric particles having a diameter of less than 220 µm was 37% by weight.

Example 2

Example 1 was repeated.

But the carrier plate was coated with a fluoroalkyl acrylate copolymer before the test. This was done by the carrier plate being deinstalled, dipped into a 3% by weight solution of NUVA® FDS (Clariant, Germany) for 10 minutes and heat treated at 160° C. in a drying cabinet for 30 minutes.

The contact angle of the coated carrier plate with water was 1160. The contact angle of the coated carrier plate with the monomer solution was 93°.

The particle size distribution of the polymeric particles obtained was determined by laser diffraction.

The fraction of polymeric particles having a diameter of less than 100 µm was 0.2% by weight.

The fraction of polymeric particles having a diameter of less than 220 µm was 12% by weight.

The inventive example shows that the fraction of small particles is distinctly reduced when the contact angle with regard to the monomer solution is increased.

We claim:

1. A process for dropletizing a monomer solution to be polymerized by means of a dropletizer plate wherein at least an underside of the dropletizer plate has at least in part a contact angle of at least 60° with regard to the monomer solution.

2. The process according to claim 1 wherein the dropletizer plate at least in part is coated with a material having a contact angle of at least 60° with regard to the monomer solution.

3. The process according to claim 2 wherein the material having a contact angle of at least 60° with regard to the monomer solution is a fluorous polymer.

4. The process according to claim 1 that utilizes a dropletizer plate having drilled holes, whose drilled holes have a diameter in the range from 50 to 1000 µm.

5. The process according to claim 1 wherein the monomer solution is a solution comprising a partially neutralized aqueous acrylic acid.

6. The process according to claim 1 wherein a reactor into which the monomer solution is dropletized has a temperature in the range from 70 to 250° C.

7. The process according to claim 1 wherein the monomer solution is dropletized into an inert gas atmosphere.

8. The process according to claim 1, wherein the monomer solution is polymerized to provide water-absorbing polymeric particles.

9. The process according to claim 1 wherein the dropletizer plate at least in part is prepared from a material having a contact angle of at least 60° with regard to the monomer solution.

10. The process according to claim 9 wherein the material having a contact angle of at least 60° with regard to the monomer solution is a fluorous polymer.

11. The process according to claim 1 wherein the monomer solution is an aqueous monomer solution.

12. The process according to claim 1 wherein the monomer solution is dropletized in a form of monodisperse droplets.

13. The process of claim 1 wherein the dropletizer plate further comprises a carrier plate having drilled holes of larger diameter than drilled holes in the dropletizer plate, and positioned under the dropletizer plate such that each drilled hole of the dropletizer plate is above a concentric drilled hole in the carrier plate.

* * * * *